United States Patent [19]

Mahr

[11] Patent Number: 4,590,121
[45] Date of Patent: May 20, 1986

[54] SAIL CLOTH

[76] Inventor: Peter Mahr, 32 Fleming La., Fairfield, Conn. 06430

[21] Appl. No.: 709,221

[22] Filed: Mar. 7, 1985

[51] Int. Cl.⁴ .............................................. B32B 7/00
[52] U.S. Cl. ................................... 428/258; 428/257; 428/259; 428/902
[58] Field of Search .................... 139/420 R; 428/229, 428/257, 258, 224, 225, 259, 226, 227, 229, 230, 231, 232, 233, 221, 902

[56] References Cited

U.S. PATENT DOCUMENTS

| | | | |
|---|---|---|---|
| 3,443,541 | 5/1969 | Chopra | 139/420 R |
| 3,918,135 | 11/1975 | Kim | 139/420 R |
| 3,949,111 | 4/1976 | Pelletur | 428/232 |
| 4,372,999 | 2/1983 | Satoo | 428/226 |
| 4,384,018 | 5/1983 | Caswell et al. | 428/225 |

FOREIGN PATENT DOCUMENTS 781756  4/1968  Canada ........................... 139/420 R Primary Examiner—James J. Bell
Attorney, Agent, or Firm—Gary, Juettner & Pyle

[57] ABSTRACT

Sail cloth is made up from a plurality of yarns in one direction woven together with a plurality of film tapes in the other direction to provide a cloth having improved properties.

4 Claims, 1 Drawing Figure

U.S. Patent     May 20, 1986     4,590,121
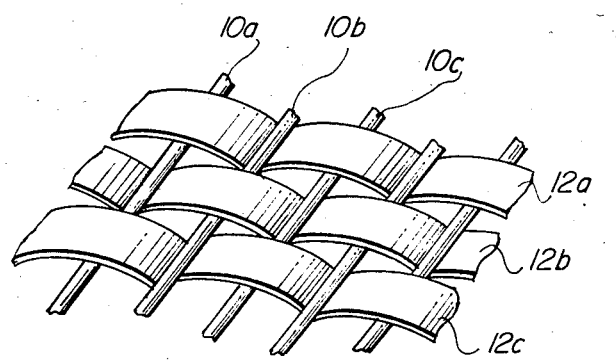

SAIL CLOTH

BACKGROUND OF THE INVENTION

This invention relates to a novel woven cloth and more particularly to a cloth used in the fabrication of sails.

Modern sail technology requires the use of cloths of synthetic materials having various weaves, weights, and finishes. The cloth used in a spinnaker, for example, must be light in weight, resistant to tear, and have low porosity. Another important factor is stretch resistance, which allows a predictable shape to be maintained in the sail under various wind conditions.

Most sail cloths are made by weaving polymeric yarns in a conventional manner. The woven cloth is usually heat treated and coated with a resin. The cloth may also be laminated to a continuous film to improve stretch resistance. In the production of spinnaker cloth, very fine yarns of polyamid fibers are woven together. Due to the fineness of the yarns and the the weaving process requires a relatively long time per unit area of cloth.

SUMMARY OF THE INVENTION

In accordance with the present invention, in a sail cloth having warp and weft yarns, either the warp or the weft is replaced by tapes composed of a film of polymeric material. Since the tapes are substantially wider than the yarns, fewer weaves are required to make the cloth. Also, porosity is greatly reduced because of the relatively large surface area of the tapes in comparison with conventional yarns. Moreover, the stretch in the direction of the yarns is considerably reduced because the tapes bend the yarns less than would be the case in conventional cloth.

THE DRAWING

The sole FIGURE is a perspective view of the novel cloth of the present invention.

DESCRIPTION OF THE PREFERRED EMBODIMENT

As shown in the drawing, the cloth of the present invention comprises a plurality of individual spaced yarns 10a, b, c and d, which are woven with a plurality of spaced tapes 12a, b, c, with the respective yarns and tapes intersecting at right angles. Conventional weaving methods may be used to make the cloth, and the tapes 12 may replace either the weft or warp yarns.

In accordance with the conventional weaving process, the warp yarns or tapes are stretched horizontally side by side on a loom, with alternate yarns being separated by a system of frames. During each weave, the frames pull the alternate warps vertically apart. Through this space is passed a shuttle carrying the weft yarn or tape, which shoots back and forth at high speed. The weft is held straight under tension while the warp-holding frames change position, causing the warps to be wrapped or crimped over and under the wefts.

It may be seen that the width of each tape 12 is substantially wider, at least 4 times and preferably more than 10 times wider than the yarn 10. Although the tapes are shown as being of equal width, various combinations of widths may be employed. The thickness of the tapes may range in the order of from about 0.00025 to 10 mil, whereas the denier of the yarns may be selected from all those suitable for the desired properties in the final product.

The tapes 12 may be prepared from a roll of polymeric film material. Suitable polymers include polyester, polyamid, acrylic, and polyolefins. The yarns 10 are made of conventional fibers which preferably include materials such as polyester, aramid, polyamid, carbon and the like.

Upon production of the cloth as shown, it may be subjected to conventional secondary treatments, such as coating with a curable resin, heat treating, calendering and the like. Also, the cloth may be laminated to a separate sheet of continuous polymer film, such as polyester film.

It may be seen that since a single tape 12 replaces a number of conventional yarns, fewer weaves and hence less loom time are required to produce the cloth in comparison with conventional cloth. The cloth is also relatively non-porous and is highly stretch resistant in the direction of the yarns 10. Variations in the width and thickness of the tapes, as well as the denier and spacing of the yarns may be employed to attain the optimum properties required for a particular application.

In the construction of a sail, a plurality of panels are prepared from the improved cloth of the present invention. Adjacent panels may then be joined in the conventional fashion, such as by stitching or bonding. The orientation of the cloth in the sail will be dependent upon the properties desired. For example, the cloth may be oriented such that the yarns 10 are substantially aligned in the direction of maximum load in the sail.

I claim:

1. An improved sail cloth comprising a plurality of spaced fibrous yarns extending in one direction in the cloth, said yarns being composed of a polymer selected from the group consisting of polyester, aramid, polyamid, and carbon, and a plurality of spaced tapes extending in the other direction in said cloth at right angles to said yarns and being woven with said yarns, said tapes being composed of polymeric film selected from the group consisting of polyester, polyamid, acrylic and polyolefin, said tapes being at least 4 times wider than said yarns and serving to reduce the porosity of said cloth.

2. The improved cloth of claim 1 wherein said polymeric film comprises polyester.

3. The improved sail cloth of claim 1 wherein said cloth comprises a panel in a sail, and wherein the yarns therein extend in the direction of maximum load on the sail.

4. The said cloth of claim 1 wherein said cloth is laminated to a second sheet of film.

* * * * *